United States Patent Office 3,341,256
Patented Sept. 12, 1967

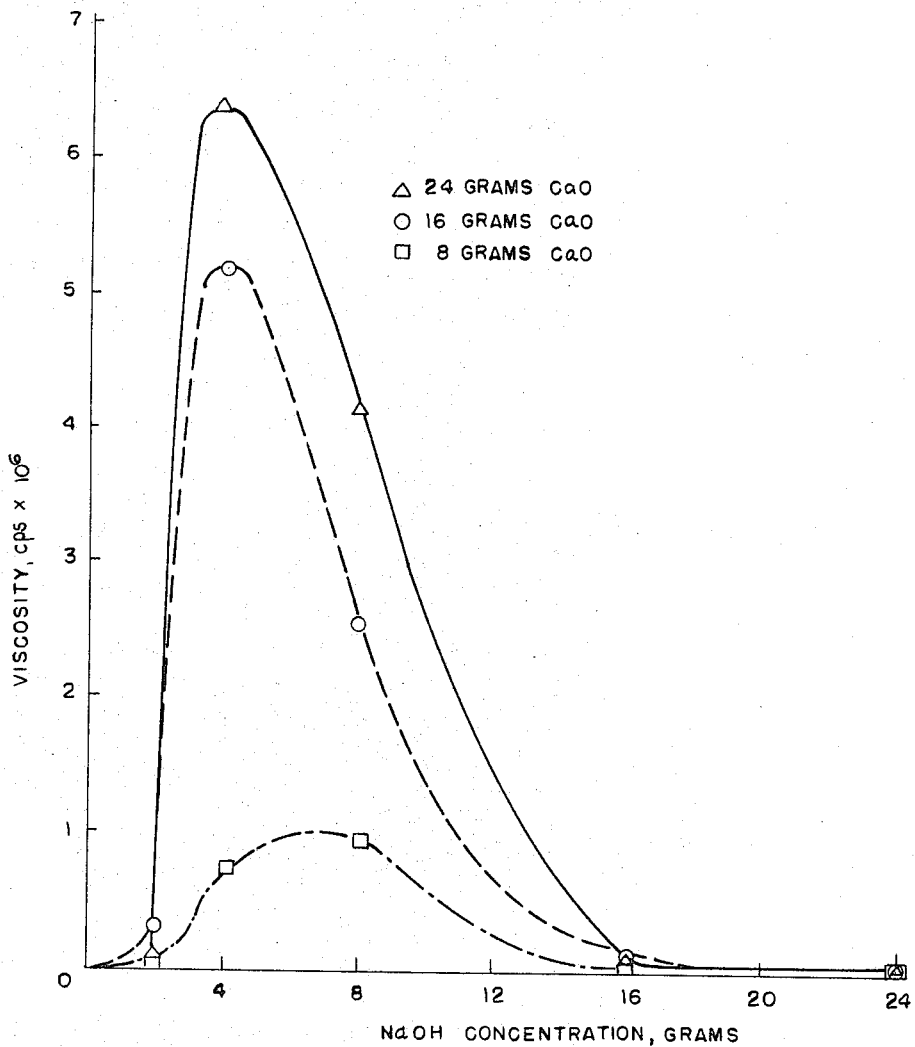

3,341,256
PROCESS FOR CONVEYING MINERAL SOLIDS THROUGH CONDUITS
Roger L. Adams, Grand Forks, N. Dak., assignor to the United States of America as represented by the Secretary of the Interior
Filed May 24, 1963, Ser. No. 283,120
14 Claims. (Cl. 302—66)

The invention herein described and claimed may be manufactured and used by or for the Government of the United States of America for governmental purposes without the payment of royalties thereon or therefor.

This invention is concerned with a preparation of thixotropic, high viscosity fluids or gels and their utilization as a transport media for pipeline conveying of mineral solids.

The figure shows the variation of viscosity of the gel with concentration of NaOH and CaO.

Pipeline transport of minerals in the form of aqueous slurries is well known, and at the present time there is special interest in utilizing this method of transport in the coal industry. See, for example, Combustion vol. 33, No. 12, page 20, June 1962. One present procedure for the pipeline transport of coal is to first pulverize the coal to a size range in which practically all the coal is $-\frac{1}{8}$ inch with approximately 30 percent passing through a 200 U.S. mesh screen, and then incorporate water to a pumpable slurry. This process consequently involves both the expense of pulverization and the high cost of separating the fine coal from the water. Techniques have been devised to burn this slurry directly but this results in a reduction of the thermal efficiency. Attempts to transport larger size particles have resulted in plugging of pumps and pipelines as the large particles settle rapidly through the low-viscosity water. Stokes law confirms this behavior by showing the inverse relationship between settling velocity and suspending-media viscosity.

It is accordingly an object of the present invention to provide a reliable and economical method of preparation of thixotropic, viscous fluids and gels for use as pipeline transport media of mineral solids.

It is a further object of the invention to provide such a fluid or gel from which separation of the suspended mineral solids is relatively simple.

It has now been found that these objectives may be accomplished by means of a viscous aqueous fluid or gel prepared from a mixture of water, leonhardite, sodium hydroxide and calcium oxide. Leonhardite is an abundant, humic acid-rich form of lignite. Dry leonhardite contains about 70 percent humic acids which are believed to have an equivalent weight of approximately 325. Leonhardite is more fully described in Bureau of Mines Report of Investigations No. 5611, 1960.

The specific proportions of the ingredients is not critical and may vary considerably depending on the desired viscosity of the viscous fluid or gel; this will in turn depend on the nature and particle size of the mineral to be transported, distance and desired speed of transport, means of separating minerals after transport and economic considerations. The most effective ranges of proportions of the chemical additives (expressed as percentage of dry leonhardite weight) have been found to be 0.5 percent to 60 percent NaOH and 0.3 percent to 94 percent CaO. The preferred range of dry leonhardite concentrations (expressed as percentage of total gel weight) is 1 percent to 27 percent. Additions of greater quantities of leonhardite increase the viscosity and solid content; however the gel effect is generally limited to the ranges given.

The thixotropic, high viscosity fluids or gels of the invention have been found to be excellent suspension media for pipeline transport of solid materials such as coal, metal ores or other minerals. The thixotropic property of the gels permits easy pumping of the highly viscous gels since the high rate of shear along the pipe wall causes a thin layer of gel to break down and thus the flow is hindered by only a very low resistance. The solid material is preferably added to the gel by simply mixing with the prepared gel; it may, however, in some cases be added to the water used to prepare the gel prior to formation of the gel.

After transport, the solid materials may be very simply and economically separated from the gel by mild application of heat to decompose the gel. After decomposition of the gel the mixture is allowed to stand until the solid material has settled to the bottom of the container. The decomposed gel liquor may then be decanted off. About 10 minutes is usually sufficient time to allow the solid material to settle out, though the optimum time will depend on the nature of the solid material, its particle size, viscosity of the decomposed gel liquor, temperature, etc.

The optimum temperature for decomposition of the gel may also vary considerably depending on the nature of the gel, the solid materials, etc. A temperature of about 75° C. has generally been found to give good results though temperatures of from about 35° C. to about 100° C. may be used. Decomposition of the gel and recovery of the solid material may also be accomplished by addition of acids, bases or various other chemicals such as acetone, alcohol, etc. These materials, in destroying the gel structure, cause a substantial viscosity decrease similar to that caused by heating, thus enabling ready recovery of the solid materials. Simple addition of water to thin the gel media can also be used to facilitate settling.

The following examples will serve to more particularly described the invention.

EXAMPLE 1

This example illustrates the preparation of the gel.

A caustic solution was prepared by dissolving 4 grams of NaOH in 360 ml. of $H_2O$. Eight grams of CaO were then added to the caustic solution and this was followed by the addition of 80 grams of raw leonhardite (26.2 percent moisture). The resulting mixture was mixed for 30 seconds with a Brookfield counter-rotating mixer and after allowing to set in a constant-temperature water bath for 30 minutes, the viscosity was read to be 750,000 centipoises at 28° C. using a Brookfield viscometer with helipath stand. This same procedure was followed in a series of experiments using different proportions of NaOH and CaO. Results are shown by the graph of the figure.

EXAMPLE 2

In this example, pumping experiments were conducted using short lengths of ¼-inch rubber tubing and a small centrifugal pump (⅟₃₀ HP) to demonstrate pumpability. A slurry made of 50 percent raw lignite ($-8 +16$ U.S. mesh) and 50 percent water was not pumpable in that plugging occurred in the pump due to the high settling rate of the particles and low viscosity of the media. This same behavior was noted using ($-16 +30$ U.S. mesh) lignite particles.

By substituting leonhardite gel in place of the water to make a slurry (50 percent lignite and 50 percent leonhardite gel), lignite particles of the same size as used above were held in very stable suspension and the slurries were found to be readily pumpable. Slurries made of sand and leonhardite gel were also found to be pumpable. Two slurries tested, containing 64 percent and 70 percent dry sand, were found to be quite stable and readily pumpable.

EXAMPLE 3

This example illustrates separation of the solid material from the gel.

The effect of temperature on the viscosity of the gels is shown in the following table. (The gel was made up of 360 ml. H₂O, 40 grams of leonhardite, 4 grams of NaOH, and 8 grams of CaO).

*Table 1*

| Temperature, °C. | Gel viscosity, cps. |
| --- | --- |
| 9.1 | 345,000 |
| 19.0 | 315,000 |
| 26.5 | 265,000 |
| 37.0 | 250,000 |
| 42.0 | 125,000 |
| 52.0 | 95,000 |
| 57.5 | 55,000 |
| 62.0 | 50,000 |
| 69.1 | 300 |

The significant decrease in viscosity at about 65° C. provides a method for removing the gel from the solids. For example, 100 grams of raw lignite (−16 +30 U.S. mesh) were mixed with 206 grams of a gel made up of 40 grams of leonhardite, 360 ml. H₂O, 4 grams of NaOH and 8 grams of CaO. The particle suspension was very stable in that after 20 minutes, no evidence of settling was found in transferring the mixture from one beaker to another. The mixture was heated to 75° C. to decompose the gel and then allowed to set for 10 minutes. At this time the lignite particles had settled to the bottom of the beaker and 130 ml. of the decomposed gel liquor were decanted off.

As indicated above, many changes could be made in the chemicals used, their proportions and steps of the process without departing from the spirit of the invention. In addition, other alkali metal bases such as KOH may be used in place of the NaOH. Also salts of alkaline earth metals such as CaCl₂ may be used in place of CaO. Synthetic leonhardite may also be used in place of the naturally occurring leonhardite. This material can be prepared by oxidizing lignite in air at 150° C.; oxidation may also be by means of oxygen or nitric acid.

Furthermore, the application of the process is not restricted to transport of the solid materials specifically disclosed, but may be used for transport of any solid materials of suitable size, density and chemical properties to be compatible with the viscous fluid or gel.

It will be apparent from the above description that applicant's process provides a reliable and economic method for preparation of thixotropic, viscous fluids or gels which provide an excellent media for pipeline transport of mineral solids. The invention has the added advantage of simple separation of the solids at the transport destination. The application of this invention to present pipeline transport of coal would greatly reduce the expenses of pulverization and slurry-dewatering. The savings in pulverization costs would result because larger particles (+16 U.S. mesh) could be transported in the viscous media without settling and consequent plugging of the pipeline.

What is claimed is:

1. A process for conveying solids through a conduit comprising passing said solids through said conduit while said solids are suspended in a thixotropic gel made essentially from (1) water, (2) leonhardite, (3) a basic alkali metal compound and (4) an alkaline earth metal compound selected from the group consisting of alkaline earth oxides and alkaline earth salts, whereby the shear between said gel and said conduit causes a thin layer of said gel to break down and thus allows flow of said solids through said conduit under a low flow resistance.

2. Process of claim 1 in which the alkali metal compound in the gel is sodium hydroxide.

3. Process of claim 1 in which the alkaline earth metal compound in the gel is calcium oxide.

4. Process of claim 1 in which the proportion of the leonhardite is about 1 to about 27 percent, based on the weight of the gel.

5. Process of claim 2 in which the proportion of the sodium hydroxide is about 0.5 to about 60 percent, based on the weight of dry leonhardite.

6. Process of claim 3 in which the proportion of the calcium oxide is about 0.3 to about 94 percent, based on the weight of dry leonhardite.

7. Process of claim 1 in which the solids are subsequently separated from the gel by decomposing the gel.

8. Process of claim 7 in which the decomposition of the gel is accomplished by heating.

9. Process of claim 8 in which the gel is decomposed by heating to about 75° C.

10. Process of claim 7 in which the gel is decomposed by addition of a material from the group consisting of acids and bases.

11. Process of claim 1 in which the solid conveyed is coal.

12. Process of claim 1 in which the solid conveyed is lignite.

13. Process of claim 1 in which the solid conveyed is a metal ore.

14. Process of claim 1 in which the proportion of said leonhardite is about 1 to about 27 percent, based on the weight of said gel; in which the proportion of said basic alkali metal compound is about 0.5 to about 60 percent, based on the weight of dry leonhardite; and in which the proportion of said alkaline earth metal compound is about 0.3 to about 94 percent, based on the weight of dry leonhardite.

References Cited

UNITED STATES PATENTS

| 1,897,545 | 2/1933 | Bird | 209—18 |
| 2,514,958 | 7/1950 | Lee | 209—18 |
| 2,794,003 | 5/1957 | Cier et al. | 252—316 |
| 2,983,687 | 5/1961 | Myers et al. | 252—316 |
| 3,019,059 | 1/1962 | McMurtrie | 302—66 |

LEON D. ROSDOL, *Primary Examiner.*

JULIUS GREENWALD, *Examiner.*

R. D. LOVERING, *Assistant Examiner.*

UNITED STATES PATENT OFFICE
CERTIFICATE OF CORRECTION

Patent No. 3,341,256                              September 12, 1967

Roger L. Adams

It is hereby certified that error appears in the above numbered patent requiring correction and that the said Letters Patent should read as corrected below.

Column 1, lines 47, 48, 49, 51, 62, 64, and 67, column 2, lines 41, 61, 62, 63, and 66, column 3, lines 3, 21, 36, and 37, and column 4, lines 3, 15, 19, 22, 39, 42, and 45, for "leonhardite", each occurrence, read -- leonardite --.

Signed and sealed this 24th day of December 1968.

SEAL)

Attest:

Edward M. Fletcher, Jr.                          EDWARD J. BRENNER

Attesting Officer                                    Commissioner of Patents